Feb. 27, 1973   HIROSHI UEDA ET AL   3,718,076
SHUTTER SPEED CONTROL APPARATUS FOR A CAMERA
Filed Dec. 23, 1970   2 Sheets-Sheet 1

INVENTOR.
Hiroshi Ueda
BY Yoshio Kuramoto
Watson, Cole, Grindle & Watson

United States Patent Office 3,718,076
Patented Feb. 27, 1973

---

3,718,076
SHUTTER SPEED CONTROL APPARATUS
FOR A CAMERA
Hiroshi Ueda, Nara, and Yoshio Kuramoto, Sakai, Osaka, Japan, assignors to Minolta Camera Kabushiki Kaisha
Filed Dec. 23, 1970, Ser. No. 101,062
Claims priority, application Japan, Dec. 29, 1969, 45/105,223
Int. Cl. G01j 1/42; G03b 17/20
U.S. Cl. 95—10 C        7 Claims

ABSTRACT OF THE DISCLOSURE

A shutter control is adjustable to the lowest speed that will provide a non-blurred photograph when a shutter speed setting member is positioned at an automatic exposure position wherein the exposure setting is determined as a function of shutter speed diaphragm aperture and film speed settings. The viewfinder displays both indications of the intensity of light and the exposure condition set by the shutter control apparatus. The diaphragm aperture setting member is also set to a setting which represents the difference between a maximum setting and a pre-set setting in accordance with the rotation angle of a rotatable ring in the lens barrel of the camera.

BACKGROUND OF THE INVENTION

The inventors have filed a copending patent application in the U.S.A. on Oct. 30, 1970, Ser. No. 85,545, wherein the exposure conditions including the shutter speed are indicated by the follow-up pointer operated by the shutter speed manual set up mechanism and the ammeter pointer is turned by mechanism for adding both the set up diaphragm value and the film sensitivity; additionally, for shutter speed automatic control the shutter speed factor is impressed on the mechanism for operating the follow-up pointer to take into consideration the critical shutter speed to account for movement of the camera and thereby the shutter speed automatically controlled is indicated to the operator in accordance with the relation between the follow-up pointer and the ammeter pointer. According to that invention it is possible to determine whether the shutter speed automatically controlled is higher or lower than the critical shutter speed; however, it is impossible to observe the object brightness itself in the viewfinder.

The present invention relates to a camera wherein shutter speed is automatically controlled from the other photographic conditions by measuring the light rays passing through the objective lens, namely, so-called "TTL-photometry" in the full opening state of the objective lens diaphragm and more particularly relates to a camera which indicates in the viewfinder whether the shutter speed is or is not in the range where camera movement will cause the photograph to be blurred.

OBJECT OF THE INVENTION

One object of the present invention is to provide an automatic shutter speed control for a camera in accordance with the photographic conditions of TTL photometry, wherein the brightness of an object is displayed in the viewfinder from the exposure meter and detects whether the shutter speed is or is not that which will result in a photograph unaffected by camera movement.

Another object of the present invention is to provide an automatic shutter speed control for a camera wherein the formation and incorporation of the ammeter is facilitated.

Still further another object of the present invention is to provide an automatic shutter speed control for a camera wherein an indication is provided in the viewfinder whether the shutter speed is or not one that will produce a photograph affected by movement of the camera, and also whether shutter speed is or not in the range to take an acceptable photograph.

The other objects of the present invention will be apparent from the detailed description of the embodiment disclosed hereinafter.

SUMMARY OF THE INVENTION

The present invention relates to an automatic shutter speed control for a camera wherein the exposure is adjusted by a shutter dial having a scale for setting the shutter speed to a desired value and a scale for an automatic control setting. The shutter speed is automatically controlled in accordance with the operation of the shutter speed set up by the shutter dial, and is interlocked with the automatic control set up by the shutter dial. An adding or accumulating mechanism for adding the input factors from the shutter speed control member is interlocked with the shutter dial, the film sensitivity set up member, and the diaphragm set up member for setting the difference between the opening diaphragm value of the objective lens and the preset diaphragm value. A follow-up pointer, one end of which appears in the viewfinder, is operated by the addition mechanism. An ammeter pointer, one end of which appears in the viewfinder, indicates TTL photometry. Upon setting the shutter dial for the automatic control the shutter speed control set up member impresses the critical shutter speed for which camera movement will not affect the photograph into the addition mechanism as an input factor, so as to indicate in the viewfinder by a deviated position of the follow-up pointer fixed by the other input factors and the ammeter pointer whether the automatically controlled shutter speed is or is not corrected.

Since the present invention is formed as described above, upon setting the shutter dial for an optional set up shutter speed, the electronic shutter is set so as to operate at that shutter speed, and the addition mechanism operates the follow-up pointer in accordance with the position of the ammeter pointer, the shutter speed, the sensitivity of the film used, and the difference between the opening diaphragm value and the preset diaphragm value. By allowing both pointers to coincide with each other the exposure is adjusted, and upon setting the shutter dial for automatic control the electronic shutter is automatically controlled in its shutter speed by the sensitivity of the film used and the incident light rays from an object, and is stopped down to the preset diaphragm value. The shutter speed control set up member interlocked with the shutter dial indicates the critical shutter speed in the viewfinder by the position of the follow-up pointer fixed by the shutter speed factor and the other factors with respect to the ammeter pointer and whether the shutter speed is or is not corrected.

DESCRIPTION OF THE PREFERRED EMBODIMENT

Figure 1:
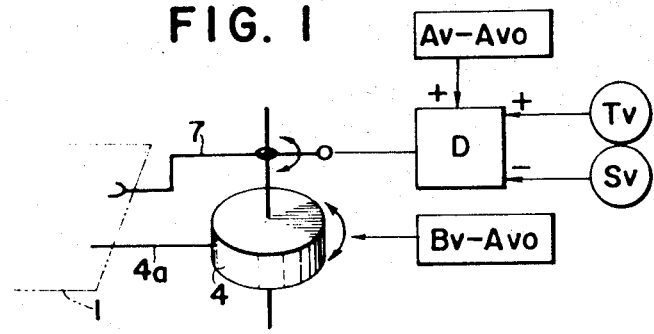
FIG. 1 is an illustrative diagram of the principle of the exposure adjustment in an automatic shutter speed control for a camera in accordance with the present invention.

Before the embodiment in accordance with the present invention is described hereinafter, with reference to FIG. 1 the exposure adjustment for a TTL camera having a follow-up pointer will be outlined.

In such a camera, provided the brightness of an object is $B_v$, the diaphragm value is $A_v$, the film sensitivity $S_v$, and the shutter speed is $T_v$, which are all well known factors for photographic operation, the proper exposure condition is as follows:

$$S_v - B_v = T_v + A_v$$

When shutter opening is done, provided the opening diaphragm value is $A_{v0}$ and for ammeter pointer $4a$ deviated by the output $(B_v - A_{v0})$ of the photoresponsive element in accordance with the measured through the opening lens, follow-up pointer 7 is operated from the output of addition mechanism D which receives film sensitivity $S_v$, shutter speed $T_v$, and index $(A - A_{v0})$ as inputs, the latter is the difference of the opening diaphragm $A_{v0}$ from the preset diaphragm value $A_v$, and by changing the input (selecting the photographic condition) for both pointers in the viewfinder follow-up pointer 7 is aligned with ammeter pointer $4a$ and thereby the following photographic operation is performed:

$$B_v - A_{v0} = (A_v - A_{v0}) - S_v + T_v$$

And, in this manner the proper exposure for a photograph is effected.

In this case, for the deviated displacement quantity of ammeter pointer $4a$, $B_v - A_{v0}$ is used as the displacement index and for the deviated displacement quantity of follow-up pointer 7, $A_v - A_{v0} - S_v + T_v$ is used as the displacement index, so that when a certain photographic condition is fixed and real numbers are set up for $B_v$, $A_v$, $S_v$, $T_v$ to be $B_{v1}$, $A_{v1}$, $S_{v1}$, $T_{v1}$, the ammeter pointer does not coincide with the follow-up pointer, and in this case the following formula applies:

$$B_{v1} - A_{v0} \gtreqless A_{v1} - A_{v0} - S_{v1} - T_{v1}$$

Wherein, for $A_{v0}$ the real number is fixed by the objective lens.

On the other hand, in the case of the automatic diaphragm shutter speed control, for a certain brightness $B_{v1}$ of an object, provided the film sensitivity set up before a photograph is taken is $S_{v1}$, the preset diaphragm value is $A_{v1}$, and the opening diaphragm value for the lens is $A_{v0}$, and under these conditions the proper shutter speed is $T_{VEE}$, the following formula applies:

$$B_{v1} - A_{v0} = A_{v1} - A_{v0} - S_{v1} + T_{VEE}$$

and $$T_{VEE} \gtreqless T_{v1}$$

This fact shows that the comparison between the ammeter pointer is a follow-up type opening photometric TTL camera and the deviated displacement of the follow-up pointer has the shutter speed indicating function.

Keeping the above fact in mind, in the present invention in order to make use of the follow-up pointer in the case of the automatic shutter speed control, the displacement of the follow-up pointer at the time of photographing is located so as to be equal to the displacement of the follow-up pointer at the time when the longest shutter speed at which no camera movement is effective, for example, 1/30 second. In the case where the follow-up type manual shutter speed is manually set up it is indicated by the relative position of the follow-up pointer and the ammeter pointer whether the shutter speed is or is not correct. In addition in accordance with the same principle, a member interlocking with the follow-up pointer is provided and thereby it is indicated whether the shutter speed automatically controlled under the given photographic condition is or is not within the limit for permitting the shutter to operate.

Figure 2:
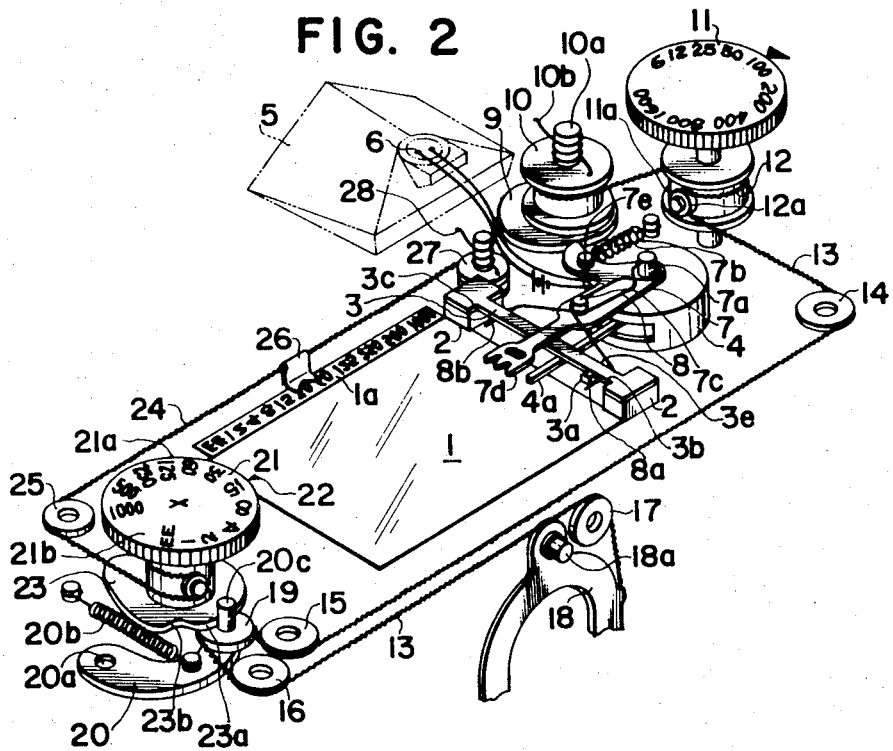
FIG. 2 is a perspective top view showing the formation of an embodiment in accordance with the present invention.

In an embodiment shown in FIG. 2 in accordance with the present invention, pointer $4a$ of ammeter 4 is rotatable outside of the focusing glass of viewfinder 1, and the deflection angle of the ammeter pointer is determined by the current running through photosensitive element 6 provided so as to receive the light rays passing through the lens, for example on the top of pentagonal prism 5 at the time of the fully opened diaphragm.

Follow-up pointer 7 is pivoted on shaft $7a$ coaxial with the rotary center of ammeter pointer $4a$ and has arm $7e$, ordinarily pressed into contact with cam plate 9 described later by means of spring $7b$, is provided slidably on the top of flat plate 3 adhered onto supporting body 2 of pentagonal prism 5, and the tip portion $7d$ thereof appears in viewfinder 1.

Spring rod 8 provided on follow-up pointer 7 is fitted loosely on rotary shaft $7a$ at its central winding portion as shown in FIG. 2, and bent so as to resiliently engage pin $7c$ mounted on follow-up pointer 7, and further bent to slide along the under face of flat plate 3 while being in contact with outside edge $3e$, and free ends $8a$, $8b$ thereof are led into viewfinder 1 in the same manner as both pointers $4a$, 7.

Projections $3b$, $3c$ provided on both ends of flat plate 3 show the boundary for the effective operational range of ammeter 4, and projection $3a$ provided on the central portion is an index for checking the battery.

Shutter dial 21 rotates relative to fixed index 22 and manual shutter speed set up scale $21a$ and mark EE $21b$ for automatic control are entered thereon, and when EE mark $21b$ is aligned with fixed index 22 the proper shutter speed is automatically fixed by the RC delay circuit for the electronic shutter using as inputs the film sensitivity $S_v$, diaphragm $A_v$, and brightness $B_v$ of an object. When manual shutter speed set up scale $21a$ is aligned with fixed index 22, an RC time constant is selected regardless of film sensitivity $S_v$, diaphragm $A_v$, and the brightness of an object $B_v$, and the delay circuit is operated by that time constant and the shutter is operated at the shutter speed set up to coincide therewith. These formations are well known so that their construction is not shown in the drawings.

On the shaft of shutter dial 21 cam plate 23, which is a shutter speed set up member, is provided fixedly, and on the circumferential edge of cam plate 23 a cam face having shallow slope $23a$ and steep slope $23b$ is provided.

Speed detection lever 20 provided with pin $20c$ for coming into contact with the cam face and pulley 19 turnable on pin $20c$ is pivoted on the camera body by pin hole $20a$, and pin $20c$ is pressed into contact with the cam face by means of spring $20b$.

On the opposite side of shutter dial 21 on the top face of the camera, film sensitivity set up dial 11 is pivoted and is provided with pulley 12 coaxially therewith, and on pulley 12 small-sized rotary shaft floating pulley $12a$ is pivoted by means of floating shaft $11a$ which rotates together with pulley 12 relative to the dial shaft.

Diaphragm coupling ring 18 is rotatably supported along the optical axis on the front of the camera body and is coupled with the preset diaphragm ring on the lens barrel by pin $18a$, to transmit the preset diaphragm value effected by the turning of the preset diaphragm ring (not shown in the drawings) and set up the displacement angle of coupling ring 18.

Cable 13 is fastened at its one end to diaphragm coupling ring 18 and fastened at the other end to take-up pulley 10 passing around fixed rotary shaft pulleys 17, 16, pulley 19 pivoted on pin $20c$ for speed detection lever 20, fixed rotary shaft pulleys 15, 14, pulley 12 pivoted on shaft $11a$ for rotating with film sensitivity set up dial 11, and rotary shaft floating pulley $12a$ pivoted on pulley 12, and further going around pulley 12.

Take-up pulley 10 is given a winding tendency about shaft 10a by spring 10b to energize cable 13 in a direction to ordinarily tension it, and provided with cam plate 9 on its shaft with which arm 7e of follow-up pointer 7 is in contact.

And, these formations are arranged so that when the manual shutter speed set up scale is aligned with fixed index 22 pin 20c comes into contact with shallow slope 23a. Regardless where ammeter pointer 4a is located in accordance with the brightness of an object, as in the well known follow-up type exposure mechanisms, using the position of pulley 19 and pin 20c as a rotary shaft as a standard, when ammeter pointer 4a coincides with the follow-up pointer a respective displacement factor is set up in order that the following formula is satisfied:

$$B_v - A_{v0} = A_v - A_{v0} - S_v + T_v$$

Similarly when EE mark 21b coincides with fixed index 22 pin 20c is moved by steep slope 23b and the position of pulley 19 using pin 20c as a rotary shaft is arranged to take the same deflection angle position as that at the time when the slowest shutter speed which causes no effect by any camera movement, for example 1/30 second, is set up.

In addition to cable 13, one end of cable 24 is fastened to shutter dial 21 and the other end thereof is fastened to pulley 27 given a winding tendency by spring 28, passing around fixed shaft pulley 25 and passing along the speed scale 1a for viewfinder 1. Cable 24 has movable indication member 26 fixed thereto in the middle and is tensioned ordinarily by spring 28 so as to show in the viewfinder the shutter speed set up by scales 21a, 21b and index 22.

Since the present invention is formed as described above, upon first turning dial 11 in accordance with the sensitivity of a film used to fix the position of floating rotary shaft pulley 12a and then turning the preset ring for the barrel to set up the desired diaphragm value, the position of dial 11 and of diaphragm coupling ring 18 are accordingly transmitted to cam plate 9.

Next, with reference to FIG. 3 and FIG. 4 the operation of the embodiment formed as described above will be explained. In order to clarify the operation FIG. 3 and FIG. 4 are diagrammatically shown by moving shutter dial 21 to the side of film sensitivity set up dial 11 and take-up pulley 10 relative to viewfinder 1.

Figure 3:
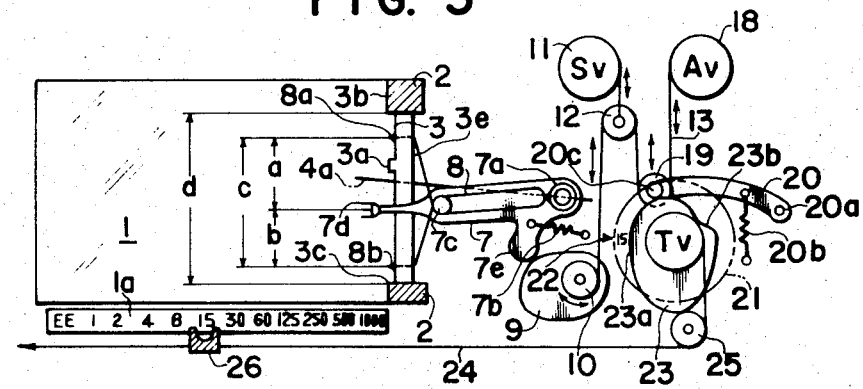
FIG. 3 is a top view showing diagrammatically the addition mechanism in that embodiment, where the shutter speed is manually set up.

When the shutter speed is set up manually for photographing, as shown in FIG. 3 shutter dial 21 is turned to put the desired manual shutter speed set up scale 21a in alignment with fixed index 22. And thus, shallow slope 23a of cam plate 23 pushes to move pin 20c to turn speed detection lever 20 and the position of pulley 19 is fixed, and in this manner cable 13 is delivered from take-up pulley 10 or taken up in a state of tension, and the turning of take-up pulley 10 turns cam plate 9 to an addition value other than the respective set up value. And the position of tip 7d of follow-up pointer 7 in contact with cam plate 9 is fixed. Also, the set value of shutter speed in this case is indicated in the viewfinder by movable indication member 26 through cable 24. When set up like this, as shown in FIG. 3 if follow-up pointer 7 does not coincide with ammeter pointer 4a, in order to change the preset diaphragm value or the set shutter speed value, diaphragm coupling ring 18 should be turned by turning the preset diaphragm ring for the barrel, or shutter dial 21, respectively, and the shutter speed at the time when both pointers coincide with each other and the diaphragm openings are set to the proper exposure.

Figure 4:
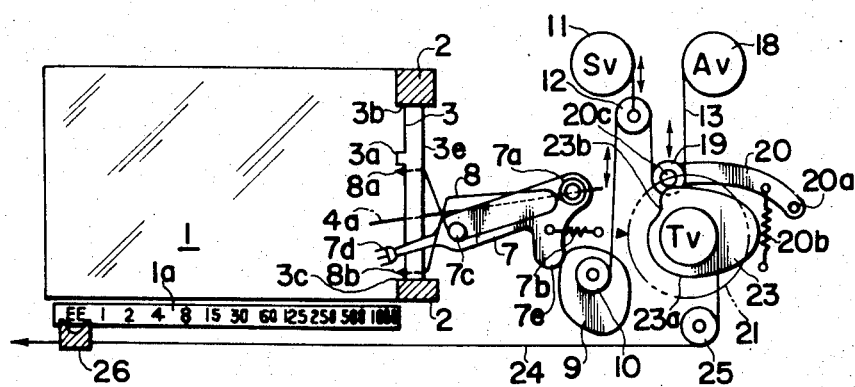
FIG. 4 is the same view as FIG. 3, in the case of automatic shutter speed control.

Next, in setting up the diaphragm and when taking a photograph for automatically fixing the shutter speed, as shown in FIG. 4 EE mark 21b on shutter dial 21 is aligned with fixed index 22. Whereupon steep slope 23b of cam plate 23 moves speed detection lever 20 to bring about the displacement position of pin 20c just to the lowest limit 1/30 second of the shutter speed which does not cause problems with movement of the camera. In setting up the film sensitivity and preset diaphragm value the turning positions of take-up pulley 10 and cam plate 9, which is an addition mechanism with take-up pulley 10, are fixed and the position of tip portion 7d of follow-up pointer 7 in contact with cam plate 9 is fixed.

In this case, as shown in FIG. 4 when ammeter pointer 4a indicates an upper position above tip portion 7d of follow-up pointer 7, the shutter speed being automatically controlled by being fixed in accordance with the brightness of an object, the film sensitivity, and the diaphragm opening, is meant to take an exposure at higher speed than 1/30 second, and even when the shutter is released there is no problem with camera movement. However, when ammeter pointer 4a is located on the lower side the automatically controlled shuter speed requires a longer time than 1/30 second and camera movement may cause problems. In such a case, therefore, the preset diaphragm opening is enlarged, and by an adjustment so that ammeter pointer 4a is located on a higher side than tip portion 7d of the follow-up pointer 7, or by making use of a tripod, or using a flashing device, such special steps will avoid problems caused by camera movement.

Spring rod 8 is intended to indicate the automatically controlled shutter speed and the highest and lowest speeds at which the shutter mechanism can operate, by means of free ends 8a, 8b, moved together with follow-up pointer 7 by pin 7c. However, in FIG. 4 when follow-up pointer 7 is deviated up or down free end 8a or 8b comes into contact with supporting body 2 and movement is immediately prevented. That position corresponds to the positions of projections 3b, 3c provided on both ends of flat plate 3 and also corresponds to the operative limit point of ammeter pointer 4a.

Spring rod 8 is composed of an elastic body, so that even when one free end 8a or 8b is prevented from moving by supporting body 2 follow-up pointer 7 is possible to move accompanied by the other free end. And, spring rod 8 has a bent portion in contact with outside edge 3e of flat plate 3 and the free end tips thereof move parallel with the inside edge of flat plate 3.

As for the opening interval between follow-up pointer 7 and free ends 8a, 8b of spring rod 8, provided that the highest shutter speed at which the electronic shutter for the camera can operate is $T_1$ (for example, 1/1000 second) and the lowest shutter speed is $T_2$ (for example, 1 second), and the lowest shutter speed at which camera movement can be tolerated is $T_3$ (for example, 1/30 second), free end 8a is arranged to be located on the position of follow-up pointer 7, that occurs when follow-up pointer 7, to which shutter dial 21 is set up for $T_3$ in relation to the optional film sensitivity, opening diaphragm value of the objective lens, and preset diaphragm set up value, only shutter dial 21 is set up for $T_1$ under the same condition, and in the same manner free end 8b is arranged to be located on the position of follow-up pointer 7, which occurs when shutter dial 21 is set up for $T_3$.

By the arrangement as described above, in the case of automatic control, when ammeter pointer 4a is located on the upper side above free end 8a, namely, within the range of d–c in FIG. 3, the photographic condition indicates overexposure and it is shown that it is necessary to stop down the diaphragm value of the preset diaphragm. Further, when ammeter pointer 4a is located between free end 8a and follow-up pointer 7, namely, within a in FIG. 3, it is shown that it is possible to take the proper shutter speed at which camera movement can be tolerated and when ammeter pointer 4a is located between follow-up pointer 7 and free end 8a, namely within b in FIG. 3, it is shown that camera movement can be tolerated. But it is possible to assume the proper shutter speed, and it is required to fix the camera to a tripod or set up the preset diaphragm further to the opening side. And, when ammeter pointer 4a is located on the lower side below free end 8b, namely, within the range of d-c in FIG. 3 it is impossible to take the proper shutter speed under such a photographic condition and it is shown that there is under exposure and the set up value of the preset diaphragm is required to be reset towards the opening side, otherwise there is need of a flash.

We claim:
1. Shutter control apparatus for a photographic camera, comprising:
 a shutter speed setting member movable both to an automatic exposure position and to a number of manual shutter speed positions;
 a film speed setting member;
 a diaphragm aperture setting member;
 a photo-responsive element for receiving scene light;
 first means positioned in response to said photo-responsive element for indicating the exposure condition within a field of view in accordance with the intensity of light;
 second means for indicating another exposure condition within said viewfinder;
 control means for determining the position of said second means for indicating within said field of view as a function of shutter speed, diaphragm aperture and film speed settings; and
 means for adjusting said second means for indicating in response to said control means to a position which indicates the lower shutter speed that will provide a non-blurred photograph with said shutter speed setting member positioned at said automatic exposure position.

2. Shutter control apparatus as set forth in claim 1 further comprising a viewfinder providing said field of view and for displaying the positions of both said first means and said second means for indicating.

3. Shutter control apparatus as set forth in claim 2, wherein
 said photo-responsive element receives the light through an objective lens,
 said diaphragm aperture setting member is set to a setting which is the difference between a maximum setting and a preset setting.

4. Shutter control apparatus as set forth in claim 3, further comprising:
 a ring rotatable in the lens barrel of said camera having a rotation angle determined in accordance with the difference between the preset size and the maximum size of the diaphragm aperture;
 a connecting ring mounted on the camera body and interlocked with said first ring and for operating said control means;
 a first pulley mechanism provided on said shutter speed setting member to determine the operation of said control means by said shutter speed setting;
 a second pulley mechanism provided on said film speed setting member to determine the operation of said control means by said film speed setting;
 a cam plate provided on said control means and biased to turn in one direction;
 a wire interconnecting said connecting ring and said control means through both said first and second pulleys for accumulating said shutter speed, diaphragm aperture, and film speed settings; and
 wherein said second means for indicating comprises an indicating needle biased to engage with said cam plate.

5. Shutter control mechanism as set forth in claim 4, further comprising:
 an additional cam plate connected to said shutter speed setting member;
 a lever biased to engage with said additional cam plate and supporting said first pulley mechanism;
 said additional cam plate having a position for determining a function of shutter speed corresponding to a manual shutter speed setting, and a position for setting a function of shutter speed corresponding to the lowest shutter speed which assures a non-blurred photograph with said camera supported by hand with said shutter speed setting member positioned at the automatic exposure position.

6. Shutter control mechanism as set forth in claim 5, wherein said second means for indicating said another exposure condition further includes:
 an indicating member composed of an elastic rod having two free ends facing both sides of said indicating needle and rotatable concentrically with said indicating needle; and
 said free ends respectively indicating the highest shutter speed and the lowest shutter speed in accordance with the film speed and diaphragm aperture setting with the shutter speed setting member positioned at said automatic exposure position and a function of shutter speed corresponding to the lowest shutter speed which provides a non-blurred photograph with said camera supported by hand.

7. Shutter control apparatus as set forth in claim 6, wherein said first means further includes an ammeter having a pointer and a projection engaging said pointer at the working limit of said pointer, and when said projection engages with said elastic rod said elastic rod enables only said pointer to turn further in the same direction by the elastic deformation thereof.

References Cited

UNITED STATES PATENTS

| | | | |
|---|---|---|---|
| 3,303,766 | 2/1967 | Karikawa et al. | 95—10 C |
| 3,491,670 | 1/1970 | Rentschler | 95—10 C E X |
| 3,555,986 | 1/1971 | Pawlik | 95—10 CT |
| 3,485,153 | 12/1969 | Ono et al. | 95—42 X |
| 3,485,154 | 12/1969 | Yamada | 95—42 X |

JOSEPH F. PETERS, JR., Primary Examiner

U.S. Cl. X.R.

95—42, 53 R